(12) United States Patent
Popovic (10) Patent No.: US 8,205,455 B2
(45) Date of Patent: Jun. 26, 2012

(54) POWER PLANT AND METHOD OF OPERATION

(75) Inventor: Predrag Popovic, Greenville, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/217,601

(22) Filed: Aug. 25, 2011

(65) Prior Publication Data

US 2012/0023956 A1 Feb. 2, 2012

(51) Int. Cl.
*F02C 3/34* (2006.01)
*F02C 6/00* (2006.01)

(52) U.S. Cl. .............. 60/772; 60/784; 60/39.52; 60/726

(58) Field of Classification Search .................. 60/772, 60/784, 785, 39.52, 726
See application file for complete search history.

(56) References Cited

U.S. PATENT DOCUMENTS

| | | |
|---|---|---|
| 2,621,475 A | 12/1952 | Loy |
| 2,646,663 A | 7/1953 | Sedille |
| 3,685,287 A | 8/1972 | Dooley |
| 3,866,411 A | 2/1975 | Marion et al. |
| 3,949,548 A | 4/1976 | Lockwood, Jr. |
| 4,267,692 A | 5/1981 | Earnest |
| 4,271,664 A | 6/1981 | Earnest |
| 4,313,300 A | 2/1982 | Wilkes et al. |
| 4,330,038 A | 5/1982 | Soukup et al. |
| 4,434,613 A | 3/1984 | Stahl |
| 4,492,085 A | 1/1985 | Stahl et al. |
| 4,528,811 A | 7/1985 | Stahl |
| 4,533,314 A | 8/1985 | Herberling |
| 4,561,245 A | 12/1985 | Ball |
| 4,566,267 A | 1/1986 | Muller et al. |
| 5,165,606 A | 11/1992 | Pelet |
| 5,361,576 A | 11/1994 | Muller |
| 5,400,587 A | 3/1995 | Keler et al. |
| 5,426,932 A | 6/1995 | Morihara et al. |

(Continued)

FOREIGN PATENT DOCUMENTS

EP 1731833 A1 12/2006
(Continued)

OTHER PUBLICATIONS

Disclosure under 37 CFR 1.56 for U.S. Appl. No. 13/217,601, filed Apr. 13, 2012.

(Continued)

*Primary Examiner* — Ted Kim
(74) *Attorney, Agent, or Firm* — Sutherland Asbill & Brennan LLP (57) ABSTRACT

A power plant and method of operation is provided. The power plant comprises at least one main air compressor, an oxidizer unit configured to deliver a compressed oxygen-rich gas flow to at least one gas turbine assembly. Each assembly comprises a turbine combustor for mixing the compressed oxygen-rich gas flow with a recirculated gas flow and a fuel stream to burn a combustible mixture and form the recirculated gas flow. The assembly also comprises a recirculation loop for recirculating the recirculated gas flow from a turbine to a turbine compressor. The assembly further comprises a recirculated gas flow extraction path for extracting a portion of the recirculated gas flow from the assembly and delivering this to a gas separation system. The gas separation system separates the portion of the recirculated gas flow into a nitrogen portion and a carbon dioxide portion.

6 Claims, 2 Drawing Sheets

U.S. PATENT DOCUMENTS

| | | |
|---|---|---|
| 5,557,919 A | 9/1996 | Althaus |
| 5,564,896 A | 10/1996 | Beeck et al. |
| 5,584,182 A | 12/1996 | Althaus et al. |
| 5,595,059 A | 1/1997 | Huber et al. |
| 5,674,066 A | 10/1997 | Hausermann et al. |
| 5,724,805 A | 3/1998 | Golomb et al. |
| 5,794,431 A | 8/1998 | Utamura et al. |
| 5,809,768 A | 9/1998 | Uematsu et al. |
| 6,050,082 A | 4/2000 | Leonard et al. |
| 6,082,093 A | 7/2000 | Greenwood et al. |
| 6,105,362 A | 8/2000 | Ohtomo |
| 6,202,400 B1 | 3/2001 | Utamura et al. |
| 6,256,976 B1 | 7/2001 | Kataoka et al. |
| 6,269,624 B1* | 8/2001 | Frutschi et al. ............. 60/39.52 |
| 6,289,666 B1 | 9/2001 | Ginter |
| 6,338,240 B1 | 1/2002 | Endo et al. |
| 6,363,709 B2 | 4/2002 | Kataoka et al. |
| 6,430,915 B1 | 8/2002 | Wiant et al. |
| 6,622,470 B2 | 9/2003 | Viteri et al. |
| 6,637,183 B2* | 10/2003 | Viteri et al. ................. 60/39.52 |
| 6,848,249 B2 | 2/2005 | Coleman et al. |
| 6,851,266 B2 | 2/2005 | Liebig |
| 6,868,677 B2 | 3/2005 | Viteri et al. |
| 6,910,335 B2 | 6/2005 | Viteri et al. |
| 7,007,487 B2 | 3/2006 | Belokon |
| 7,032,388 B2 | 4/2006 | Healy |
| 7,089,743 B2 | 8/2006 | Frutschi |
| 7,127,898 B2 | 10/2006 | Healy |
| 7,383,686 B2 | 6/2008 | Aycock et al. |
| 7,490,472 B2 | 2/2009 | Lynghjem et al. |
| 7,503,178 B2 | 3/2009 | Bücker |
| 7,516,609 B2 | 4/2009 | Agnew |
| 7,726,114 B2 | 6/2010 | Evulet |
| 7,739,864 B2 | 6/2010 | Finkenrath et al. |
| 7,895,822 B2 | 3/2011 | Hoffmann et al. |
| 2003/0051481 A1* | 3/2003 | Priestley .......................... 60/782 |
| 2004/0011057 A1 | 1/2004 | Huber |
| 2004/0134194 A1 | 7/2004 | Roby et al. |
| 2005/0028529 A1 | 2/2005 | Bartlett et al. |
| 2005/0150229 A1 | 7/2005 | Baer et al. |
| 2007/0006592 A1 | 1/2007 | Balan et al. |
| 2007/0034171 A1 | 2/2007 | Griffin et al. |
| 2007/0068167 A1 | 3/2007 | Patel et al. |
| 2007/0125063 A1 | 6/2007 | Evulat |
| 2007/0125064 A1 | 6/2007 | Sonoda |
| 2007/0125091 A1 | 6/2007 | Roby et al. |
| 2007/0220896 A1* | 9/2007 | Varatharajan et al. .......... 60/772 |
| 2008/0010967 A1 | 1/2008 | Griffin et al. |
| 2008/0104938 A1 | 5/2008 | Finkenrath et al. |
| 2008/0104939 A1 | 5/2008 | Hoffmann et al. |
| 2008/0104958 A1* | 5/2008 | Finkenrath et al. .......... 60/605.2 |
| 2008/0120960 A1 | 5/2008 | Agnew |
| 2008/0309087 A1 | 12/2008 | Evulet et al. |
| 2009/0199566 A1 | 8/2009 | Lebas et al. |
| 2009/0218821 A1 | 9/2009 | Elkady et al. |
| 2009/0280003 A1 | 11/2009 | Schriner et al. |
| 2009/0284013 A1 | 11/2009 | Anand et al. |
| 2009/0301054 A1 | 12/2009 | Simpson et al. |
| 2010/0018218 A1 | 1/2010 | Riley et al. |
| 2010/0115960 A1 | 5/2010 | Brautsch et al. |
| 2010/0126181 A1 | 5/2010 | Ranasinghe et al. |
| 2010/0170218 A1 | 7/2010 | Eluripati et al. |
| 2010/0180565 A1 | 7/2010 | Draper |
| 2011/0067408 A1 | 3/2011 | Maly |
| 2011/0138766 A1 | 6/2011 | ElKady et al. |
| 2011/0289898 A1 | 12/2011 | Hellat et al. |

FOREIGN PATENT DOCUMENTS

| | | |
|---|---|---|
| EP | 2078827 A1 | 7/2009 |
| EP | 2206959 A2 | 7/2010 |

OTHER PUBLICATIONS

Bandar Duraya Al-Anazi, "Enhanced Oil Recovery Techniques and Nitrogen Injection," CSEG Recorder, Oct. 2007, pp. 28-33.

* cited by examiner

POWER PLANT AND METHOD OF OPERATION

BACKGROUND OF THE INVENTION

The subject matter of the present disclosure relates generally to the field of electric power plants, and more particularly to methods of operating stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a power plant arrangement is provided. The power plant arrangement comprises at least one main air compressor for compressing ambient air into a compressed ambient gas flow, an oxidizer unit for receiving at least a first portion of the compressed ambient gas flow from the at least one main air compressor and configured to deliver a compressed oxygen-rich gas flow to at least one gas turbine assembly, and the at least one gas turbine assembly. Each gas turbine assembly comprises a turbine combustor, fluidly connected to the oxidizer unit, for mixing the compressed oxygen-rich gas flow with at least a first portion of a recirculated flow and a fuel stream to form a combustible mixture and for burning the combustible mixture and forming the recirculated gas flow. The gas turbine assembly further comprises a turbine connected to the turbine combustor and to a turbine shaft, wherein the turbine is arranged to be driven by the recirculated gas flow from the turbine combustor. The assembly further comprises a turbine compressor, fluidly connected to the turbine combustor, and connected to the turbine shaft and being arranged to be driven thereby. The assembly also includes a recirculation loop for recirculating the recirculated gas flow from the turbine to the turbine compressor. The assembly further includes a recirculated gas flow extraction path for extracting at least a second portion of the recirculated gas flow from the at least one gas turbine assembly and delivering the at least a second portion of the recirculated gas flow to a gas separation system. The gas separation system separates the at least a second portion of the recirculated gas flow into a nitrogen portion and a carbon dioxide portion.

In another aspect, a method for operating a power plant is provided. The method comprises compressing ambient air with at least one main air compressor to form a compressed ambient gas flow. At least a first portion of the compressed ambient gas flow is delivered to an oxidizer unit, wherein the oxidizer unit is configured to deliver a compressed oxygen-rich gas flow to at least on gas turbine assembly. The compressed oxygen-rich gas flow is mixed with at least a first portion of a recirculated gas flow and a fuel stream to form a combustible mixture and the mixture is burned in a turbine combustor to produce the recirculated gas flow. The method further comprises driving a turbine, connected to a turbine shaft, using the recirculated gas flow and driving a turbine compressor, using the turbine shaft, that is fluidly connected to the turbine combustor. The method also comprises recirculating the recirculated gas flow from the turbine to the turbine compressor using a recirculation loop and extracting at least a second portion of the recirculated gas flow from the at least one gas turbine assembly using a recirculated gas flow extraction path. The method further comprises separating the at least a second portion of the recirculated low oxygen content gas flow into a nitrogen portion and a carbon dioxide portion using a gas separation system.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, a largely oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates at near combustion stoichiometry.

A stoichiometric combustion reaction of methane and oxygen is illustrated below:

Stoichiometric combustion results in gas temperatures that may be too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be significantly oxygen free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. It some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

In some embodiments, a portion of a recirculated gas flow 50 may be extracted from at least one gas turbine assembly and separated into a nitrogen portion and a carbon dioxide portion. Additionally, maximizing the purity of carbon dioxide and nitrogen production in an SEGR power plant may be a goal. In some of the specific embodiments, the present technique may include using the SEGR cycle to provide low oxygen content streams of carbon dioxide and nitrogen for use in enhanced oil recovery applications.

Power Plant Arrangements

Figure 1:
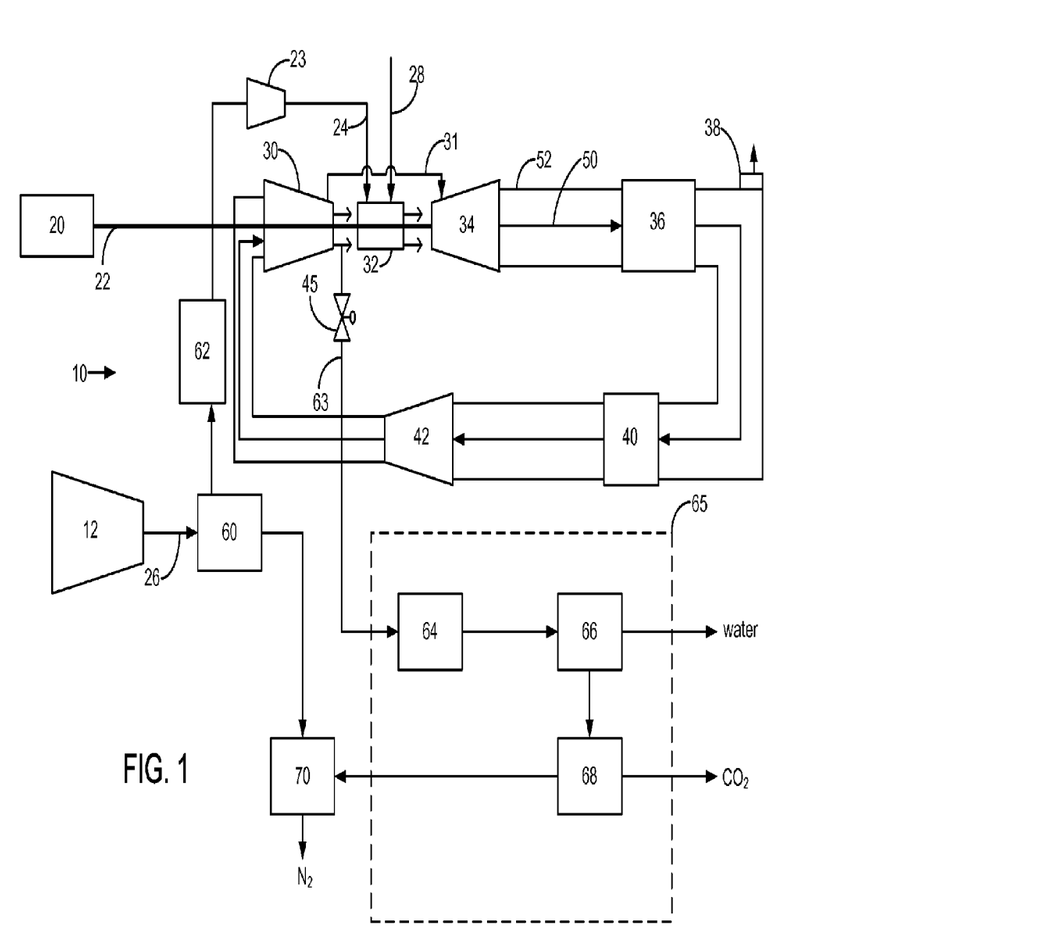
FIG. 1 is a diagrammatical illustration of an exemplary power plant arrangement 10 in accordance with an embodiment of the present invention.

Turning now to the drawings and referring first to FIG. 1 an exemplary power plant arrangement 10 is illustrated. In some embodiments, the power plant arrangement 10 may include a main air compressor 12 for compressing ambient air into at least a first portion of a compressed ambient gas flow 26. In some embodiments, the at least a first portion of the compressed ambient gas flow 26 may first be delivered to a nitrogen separation unit 60 that may be configured to separate nitrogen from the at least a first portion of the compressed ambient gas flow 26. The at least a first portion of the compressed ambient gas flow 26 may be passed through the nitrogen separation unit 60 and at least a portion of the nitrogen in the compressed ambient gas flow 26 may be separated and removed from the at least a first portion of the compressed ambient gas flow 26. Any suitable commercially available nitrogen separation unit may be used. From the nitrogen separation unit 60, the nitrogen that is removed from the at least a first portion of the compressed ambient gas flow 26 may be delivered to a nitrogen storage unit 70, wherein the nitrogen storage unit 70 may be fluidly connected to an output of the nitrogen separation unit 60 and may be configured to receive and to store nitrogen. The at least a first portion of the compressed ambient gas flow 26 may then be delivered from the nitrogen separation unit 60 to an oxidizer unit 62.

Further, the at least one gas turbine assembly of the power plant arrangement 10 may include a turbine combustor 32 that may be fluidly connected to the oxidizer unit 62. The turbine combustor 32 may be configured to receive a compressed oxygen-rich gas flow 24 from the oxidizer unit 62, at least a first portion of a recirculated gas flow 50 from a turbine compressor 30, and a fuel stream 28, to form a combustible mixture and to burn the combustible mixture to generate the recirculated gas flow 50. In some embodiments, the oxidizer unit 62 may deliver the compressed oxygen-rich gas flow 24 that has an oxygen concentration in an amount from about 25 vol % to about 50 vol % oxygen, from about 30 vol % to about 50 vol % oxygen, or from about 40 vol % to about 50 vol % oxygen.

As used herein, the term "recirculated gas flow" refers to the gas flow generated by the burning of the combustible mixture in the turbine combustor 32 and flowing through a recirculation loop 52.

As used herein, the term "gas turbine assembly" refers to all listed components of the power plant arrangements except for the main air compressor 12. In embodiments comprising multiple main air compressors, the term "gas turbine assembly" refers to all listed components of the power plant arrangements except for the multiple main air compressors.

In some embodiments of the exemplary power plant arrangement 10, the recirculated gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In still other embodiments, the recirculation loop 52 may not comprise the recirculated gas flow cooler 40.

In some embodiments of the power plant arrangement 10, the recirculated gas flow cooler 40 may be incorporated into the recirculation loop 52 anywhere downstream from the turbine 34. The recirculated gas flow cooler 40 may be configured to lower the temperature of the recirculated gas flow 50 to a suitable temperature for downstream delivery into the turbine compressor 30 via the recirculation loop 52. In some embodiments, a suitable temperature may be below about 66° C., below about 49° C., or below about 45° C.

In addition, the at least one gas turbine assembly of the exemplary power plant arrangement 10 may include a turbine 34 located downstream of the turbine combustor 32. The turbine 34 may be configured to expand the recirculated gas flow 50 received from the turbine combustor 32 and may be used to drive an external load such as a turbine generator 20 via a turbine shaft 22 to generate electricity. As illustrated by FIG. 1, the turbine compressor 30 may be driven by the power generated by the turbine 34 via the turbine shaft 22. In other embodiments, the main air compressor 12 may also be driven by the turbine shaft 22.

In some embodiments, the at least one gas turbine assembly of the power plant arrangement 10 may include a recirculated gas flow extraction path 63 for extracting at least a second portion of the recirculated gas flow 50 from the at least one gas turbine assembly and delivering the at least a second portion of the recirculated gas flow 50 to a gas separation system 65. In some embodiments, the recirculated gas flow extraction path 63 may be regulated by an extraction valve 45.

The gas separation system 65 may be used to separate the at least a second portion of the recirculated gas flow 50 into a nitrogen portion and a carbon dioxide portion. In some embodiments of the power plant arrangement 10, the gas separation system 65 may comprise a carbon monoxide catalyst 64 that may be fluidly connected to the input of the gas separation system 65 and may be configured to receive the at least a second portion of the recirculated gas flow 50. The carbon monoxide catalyst 64 may be used to convert oxygen and carbon monoxide in the second portion of the recirculated gas flow 50 to carbon dioxide and may produce an exhaust gas flow. Any suitable commercially available carbon monoxide catalyst may be used. The exhaust gas flow may be directed from the output of the carbon monoxide catalyst 64 to a water condensation unit 66. The water condensation unit 66 then may remove water from the exhaust gas flow as purified water and may further deliver the exhaust gas flow to a carbon dioxide separation unit 68. The purified water may be collected. The carbon dioxide separation unit 68 may separate carbon dioxide from the exhaust gas and deliver a remaining exhaust gas flow, comprising primarily nitrogen, to the nitrogen storage unit 70. Any suitable commercially available carbon dioxide separation unit may be used.

In some embodiments of the exemplary power plant arrangement 10, the recirculated gas flow extraction path 63 may be in fluid communication with an output of the turbine compressor 30. In other embodiments, the recirculated gas flow extraction path 63 may be attached to any point of the recirculation loop 52.

In some embodiments, the gas turbine assembly may further comprise a secondary flow path 31 that delivers at least a third portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

As illustrated by FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

In some embodiments of the exemplary power plant arrangement 10, a booster compressor 23 may be incorporated downstream of and in fluid connection with the main air compressor 12 and upstream of and in fluid connection with the turbine combustor 32. The booster compressor 23 may further compress the compressed oxygen-rich gas flow 24 before delivery into the turbine combustor 32.

In some embodiments of the power plant arrangement 10, a blower 42 may be fluidly connected to the recirculation loop 52. In some embodiments, the blower 42 may be located in the recirculation loop 52 upstream of or downstream from the recirculated gas flow cooler 40. The blower 42 may be configured to increase the pressure of the recirculated gas flow 50 prior to delivery into the turbine compressor 30 via the recirculation loop 52.

In some embodiments, the recirculated gas flow cooler 40 and the blower 42 may be configured to condense water from the recirculated gas flow 50. In still other embodiments, the water condensed from the recirculated gas flow 50 may delivered from the recirculation loop 52 to the purified water that is collected from the water condensation unit 66.

In some embodiments of the exemplary power plant arrangement 10, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments of the exemplary power plant arrangement 10, the exemplary power plant arrangement 10 may include a damper door 38 connected to the recirculation loop 52. The damper door 38 may be opened to vent a portion of the recirculated gas flow 50 to the atmosphere.

Figure 2:
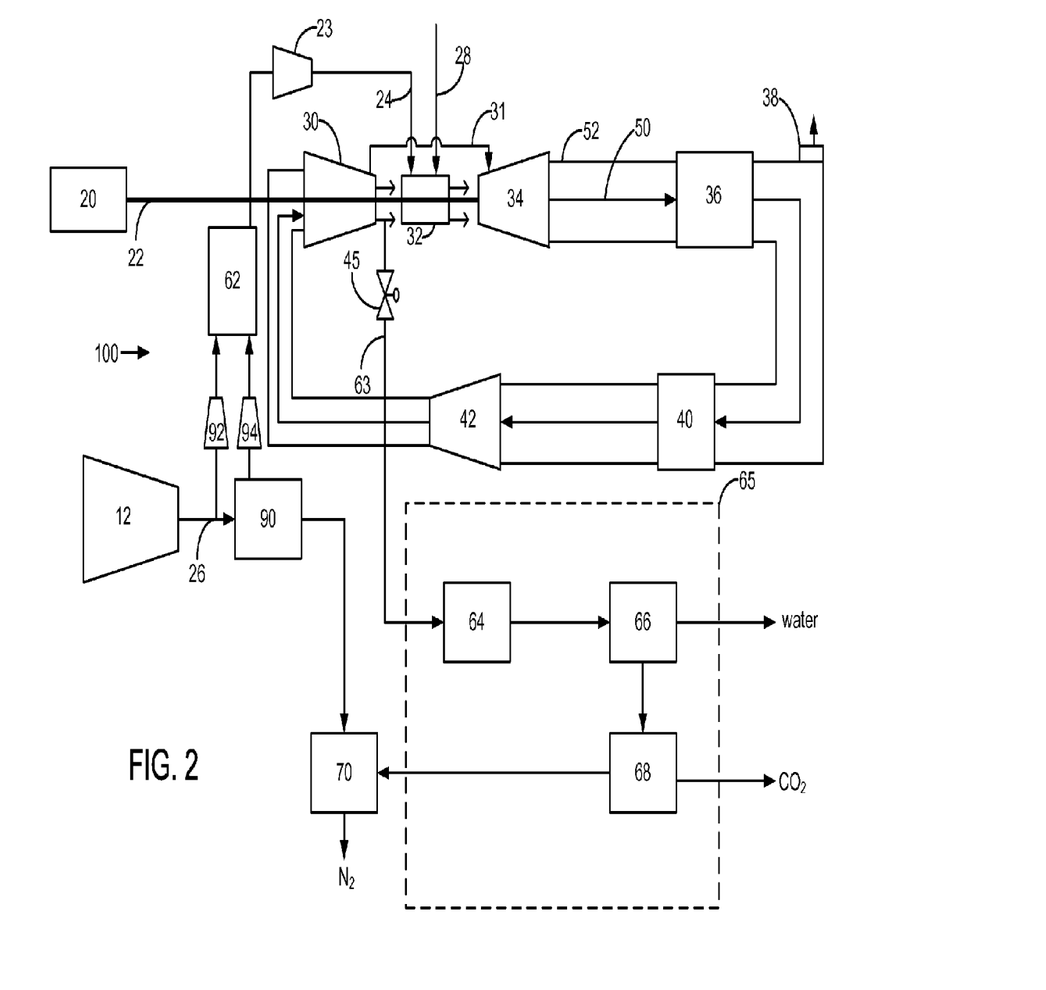
FIG. 2 is a diagrammatical illustration of an exemplary power plant arrangement 100 in accordance with an embodiment of the present invention.

In some embodiments, and as depicted in FIG. 2 as exemplary power plant arrangement 100, the power plant arrangement may include a main air compressor 12 for compressing ambient air into a compressed ambient gas flow 26. In some embodiments, at least a first portion of the compressed ambient gas flow 26 may be delivered to an air separation unit 90 that may be configured to separate both nitrogen and oxygen from the compressed ambient air. The at least a first portion of the compressed ambient gas flow 26 may be passed through the air separation unit 90 and at least a portion of the nitrogen in the at least a first portion of the compressed ambient gas flow 26 may be separated and may be removed from the at least a first portion of the compressed ambient gas flow 26 and at least a portion of the oxygen in the at least a first portion of the compressed ambient gas flow 26 may be separated and may be removed from the at least a first portion of the compressed ambient gas flow 26. Any suitable commercially available air separation unit may be used, typically using cryogenic technology. From the air separation unit 90, the nitrogen that may be removed from the at least a first portion of the compressed ambient gas flow 26 may be delivered to a nitrogen storage unit 70, wherein the nitrogen storage unit 70 may be fluidly connected to an output of the air separation unit 90 and may be configured to receive and to store nitrogen.

In some embodiments of the exemplary power plant arrangement 100, the oxygen that may be removed from the at least a first portion of the compressed ambient gas flow 26 may be delivered from the air separation unit 90 to an oxidizer unit 62. In some embodiments, the oxygen may be further compressed using an oxygen compressor 94 that may be fluidly connected to the output of the air separation unit 90 and an input of the oxidizer unit 62.

In embodiments of the exemplary power plant arrangement 100, at least a second portion of the compressed ambient gas flow 26 may be delivered to the oxidizer unit 62. In some embodiments, the at least a second portion of the compressed ambient gas flow 26 may be further compressed using a secondary compressor 92 that may be fluidly connected to the output of the main air compressor 12 and an input of the oxidizer unit 62.

In embodiments of the exemplary power plant arrangement 100, the oxidizer unit 62 may be configured to receive both oxygen from the air separation unit 90 and the at least a second portion of the compressed ambient gas flow 26 from the main air compressor 12 and may mix both of these gas flows to produce a compressed oxygen-rich gas flow 24, which now has an increased oxygen concentration relative to the oxygen concentration of compressed ambient air. In some embodiments, the compressed oxygen-rich gas flow 24 may have an oxygen concentration in an amount from about 25 vol % to about 50 vol % oxygen, from about 30 vol % to about 50 vol % oxygen, or from about 40 vol % to about 50 vol % oxygen.

Further, the at least one gas turbine assembly of the exemplary power plant arrangement 100 may include a turbine combustor 32 that may be fluidly connected to the oxidizer unit 62. The turbine combustor 32 may be configured to receive the compressed oxygen-rich gas flow 24 from the oxidizer unit 62, at least a first portion of a recirculated gas flow 50 from a turbine compressor 30, and a fuel stream 28, to form a combustible mixture and to burn the combustible mixture to generate the recirculated gas flow 50.

In addition, the at least one gas turbine assembly of the exemplary power plant arrangement 100 may include a turbine 34 that may be located downstream of the turbine combustor 32. The turbine 34 may be configured to expand the exhaust gas and may be used to drive an external load such as a turbine generator 20 via a turbine shaft 22 to generate electricity. In the illustrated embodiment 100, the turbine compressor 30 may be driven by the power generated by the turbine 34 via the turbine shaft 22. In some embodiments, the main air compressor 12 may also be driven by the turbine shaft 22.

In some embodiments, the at least one gas turbine assembly of the exemplary power plant arrangement 100 may be configured such that the recirculated gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In some embodiments, the recirculation loop 52 may not comprise the recirculated gas flow cooler 40.

In some embodiments of the at least one gas turbine assembly of the exemplary power plant arrangement 100, the recirculated gas flow cooler 40 may be incorporated into the recirculation loop 52 anywhere downstream from the turbine 34. The recirculated gas flow cooler 40 may be configured to lower the temperature of the recirculated gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, the at least one gas turbine assembly of the exemplary power plant arrangement 100 may include a recirculated gas flow extraction path 63 for extracting at least a second portion of the recirculated gas flow 50 from the at least one gas turbine assembly and may deliver the at least a second portion of the recirculated gas flow 50 to a gas separation system 65. In some embodiments, the recirculated gas flow extraction path 63 may be regulated by an extraction valve 45.

The gas separation system 65 may be used to separate the at least a second portion of the recirculated gas flow 50 into a nitrogen portion and a carbon dioxide portion. In some embodiments of the exemplary power plant arrangement 100, the gas separation system 65 may comprise a carbon monoxide catalyst 64 that may be fluidly connected to the input of the gas separation system 65 and may be configured to receive the at least a second portion of the recirculated gas flow 50. The carbon monoxide catalyst 64 may be used to convert oxygen and carbon monoxide in the at least a second portion of the recirculated gas flow 50 into carbon dioxide and may produce an exhaust gas flow. Any suitable commercially available carbon monoxide catalyst may be used. The exhaust gas flow may be directed from the output of the carbon monoxide catalyst 64 to a water condensation unit 66. The water condensation unit 66 then may remove purified water from the exhaust gas flow and may further deliver the exhaust gas flow to a carbon dioxide separation unit 68. The purified water may be collected. The carbon dioxide separation unit 68 may separate carbon dioxide from the exhaust gas and may deliver a remaining exhaust gas flow, comprising primarily nitrogen, to the nitrogen storage unit 70. Any suitable commercially available carbon dioxide separation unit may be used.

In some embodiments of the exemplary power plant arrangement 100, the recirculated gas flow extraction path 63 may be in fluid communication with an output of the turbine compressor 30. In other embodiments, the recirculated gas flow extraction path 63 may be attached to any point of the recirculation loop 52.

As illustrated by FIG. 2, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

In embodiments, the gas turbine assembly may further comprise a secondary flow path 31 that delivers at least a third portion of the recirculated gas flow 50 from the turbine compressor 30 to the turbine 34 as a secondary flow. The secondary flow may be used to cool and to seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments of the exemplary power plant arrangement 100, a booster compressor 23 may be incorporated downstream of and in fluid connection with the main air compressor 12 and upstream of and in fluid connection with the turbine combustor 32. The booster compressor 23 may further compress the compressed oxygen-rich gas flow 24 before delivery into the turbine combustor 32.

In still other embodiments of the exemplary power plant arrangement 100, a blower 42 may be fluidly connected to the recirculation loop 52. In some embodiments, the blower 42 may be located in the recirculation loop 52 upstream of or downstream from the recirculated gas flow cooler 40. The blower 42 may be configured to increase the pressure of the recirculated gas flow 50 prior to delivery into the turbine compressor 30 via the recirculation loop 52.

In some embodiments, the recirculated gas flow cooler 40 and the blower 42 may be configured to condense water from the recirculated gas flow 50. In still other embodiments, the water condensed from the recirculated gas flow 50 may delivered from the recirculation loop 52 to the purified water that is collected from the condensation unit 66.

In some embodiments of the exemplary power plant arrangement 100, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments of the exemplary power plant arrangement 100, the power plant arrangement 10 may include a damper door 38 connected to the recirculation loop 52. The damper door 38 may be opened to vent a portion of the recirculated gas flow 50 to the atmosphere.

In some embodiments, the power plant arrangements may be configured to deliver compressed nitrogen for enhanced oil recovery. In other embodiments, the power plant arrangements may be configured to deliver compressed carbon dioxide for enhanced oil recovery. In still other embodiments, the power plant arrangements may be configured to deliver water. In yet other embodiments, the power plant arrangements may be configured to deliver any combination of the foregoing.

In some embodiments, the power plant arrangement may comprise one gas turbine assembly. In other embodiments, the power plant arrangement may comprise two or more gas turbine assemblies that are fluidly connected by an inter-train conduit. As used herein, the term "inter-train conduit" may refer to any fluid connection between two or more gas turbine assemblies and one or more main air compressors. In still other embodiments, the power plant arrangement may comprise three or more gas turbine assemblies and one or more additional main air compressors, wherein the additional main air compressors are in fluid connection with each other and with the gas turbine assemblies. In yet other embodiments, the power plant arrangement may be configured for substantially stoichiometric combustion. In still other embodiments, the power plant arrangement may be configured for substantially zero emissions power production.

In some embodiments, the fuel stream 28 may comprise an organic gas, including but not limited to methane, propane, and/or butane. In still other embodiments, the fuel stream 28 may comprise an organic liquid, including but not limited to methanol and/or ethanol. In yet other embodiments, the fuel stream 28 may comprise a fuel source obtained from a solid carbonaceous material such as coal.

Method of Operation

In some embodiments, a method for operating an exemplary power plant arrangement 10 is provided, wherein ambient air may be compressed using a main air compressor 12 to form at least a first portion of a compressed ambient gas flow 26. In some embodiments, the at least a first portion of the compressed ambient gas flow 26 may first be delivered to a nitrogen separation unit 60 that may be configured to separate nitrogen from the at least a first portion of the compressed ambient gas flow 26. The at least a first portion of the compressed ambient gas flow 26 may be passed through the nitrogen separation unit 60 and at least a portion of the nitrogen in the at least a first portion of the compressed ambient gas flow 26 may be separated and removed from the at least a first portion of the compressed ambient gas flow 26. Any suitable commercially available nitrogen separation unit may be used. From the nitrogen separation unit 60, the nitrogen that is removed from the at least a first portion of the compressed ambient gas flow 26 may be delivered to a nitrogen storage unit 70, wherein the nitrogen storage unit 70 may be fluidly connected to an output of the nitrogen separation unit 60 and may be configured to receive and to store nitrogen. After at least some nitrogen has been removed, the at least a portion of the compressed ambient gas flow 26 may then be delivered from the nitrogen separation unit 60 to an oxidizer unit 62.

In some embodiments, the nitrogen separation unit 60 may be adjusted such that a specific quantity of nitrogen may be selectively removed from the at least a first portion of the compressed ambient gas flow 26 before delivery to the oxidizer unit 62. In some embodiments, the oxidizer unit 62 may contain at least a first portion of the compressed ambient gas flow 26 that has had a specific quantity of nitrogen removed to yield a compressed oxygen-rich gas flow 24 with an oxygen concentration in an amount from about 25 vol % to about 50 vol % oxygen, from about 30 vol % to about 50 vol % oxygen, or from about 40 vol % to about 50 vol % oxygen. As used herein, the term "at least a first portion of the compressed ambient gas flow 26 that has had a specific quantity of nitrogen removed" is equivalent to the term "a compressed oxygen-rich gas flow 24."

The compressed oxygen-rich gas flow 24 may be delivered from the oxidizer unit 62 to at least one gas turbine assembly of the exemplary power plant arrangement 10, wherein the at least one gas turbine assembly may include a turbine combustor 32 that may be fluidly connected to the oxidizer unit 62. The turbine combustor 32 may be configured to receive and to mix the compressed oxygen-rich gas flow 24 from the oxidizer unit 62, at least a first portion of a recirculated gas flow 50 from a turbine compressor 30, and a fuel stream 28, to form a combustible mixture and to burn the combustible mixture to produce the recirculated gas flow 50. In some embodiments, the oxidizer unit 62 may deliver the compressed oxygen-rich gas flow 24 that has an oxygen concentration in an amount from about 25 vol % to about 50 vol % oxygen, from about 30 vol % to about 50 vol % oxygen, or from about 40 vol % to about 50 vol % oxygen.

In addition, the method of operating the exemplary power plant arrangement 10 may include driving a turbine 34 using the recirculated gas flow 50, thereby causing the turbine 34 to rotate. As used herein, the term "driven using the recirculated gas flow" means the recirculated gas flow 50 expands upon exit from the turbine combustor 32 and upon entrance into the turbine 34, thereby causing the turbine 34 to rotate.

In some embodiments, rotation of the turbine 34 may cause the turbine shaft 22 and also the turbine compressor 30 to rotate. The turbine shaft 22 may rotate in the turbine generator 20, such that rotation of the turbine shaft 22 may cause the turbine generator 20 to generate electricity. In some embodiments, the turbine compressor 30 may be fluidly connected to the turbine combustor 32 such that the turbine compressor 30 may compress and may deliver the at least a first portion of the recirculated gas flow 50 to the turbine combustor 32.

In some embodiments of the method to operate the exemplary power plant arrangement 10, the recirculated gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In other embodiments, the recirculation loop 52 may not comprise the recirculated gas flow cooler 40.

In some embodiments, the recirculated gas flow 50 may be recirculated directly from the output of the turbine 34 to the input of the turbine compressor 30 using the recirculation loop 52. In other embodiments, the recirculated gas flow 50 may be cooled to a suitable temperature before delivery to the turbine compressor 30 using the recirculated gas flow cooler 40. The recirculated gas flow cooler 40 may be incorporated into the recirculation loop 52 anywhere downstream from the turbine 34. In some embodiments, a suitable temperature may be below about 66° C., below about 49° C., or below about 45° C.

The method for operating the exemplary power plant arrangement 10 may further comprise extracting at least a second portion of the recirculated gas flow 50 from the at least one gas turbine assembly using a recirculated gas flow extraction path 63 and delivering the at least a second portion of the recirculated gas flow 50 to a gas separation system 65. In some embodiments, the recirculated gas flow extraction path 63 may be regulated by an extraction valve 45.

The gas separation system 65 may be used to separate the at least a second portion of the recirculated gas flow 50 into a nitrogen portion and a carbon dioxide portion. In some embodiments of the power plant arrangement 10, the gas separation system 65 may comprise a carbon monoxide catalyst 64 that may be fluidly connected to the input of the gas separation system 65 and may be configured to receive the at least a second portion of the recirculated gas flow 50. The carbon monoxide catalyst 64 may be used to convert oxygen and carbon monoxide in the at least a second portion of the recirculated gas flow 50 to carbon dioxide and to produce an exhaust gas flow. Any suitable commercially available carbon monoxide catalyst may be used. The exhaust gas flow may be directed from the output of the carbon monoxide catalyst 64 to a water condensation unit 66. The water condensation unit 66 then may remove purified water from the exhaust gas flow and further deliver the exhaust gas flow to a carbon dioxide separation unit 68. The purified water may be collected. The carbon dioxide separation unit 68 may separate carbon dioxide from the exhaust gas flow and deliver a remaining exhaust gas flow, comprising primarily nitrogen, to the nitrogen storage unit 70. Any suitable commercially available carbon dioxide separation unit may be used.

In embodiments of the method for operating the exemplary power plant arrangement 10, the recirculated gas flow extraction path 63 may be in fluid communication with an output of the turbine compressor 30. In other embodiments, the recirculated gas flow extraction path 63 may be attached to any point of the recirculation loop 52.

As illustrated by FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

In some embodiments, the gas turbine assembly may further comprise a secondary flow path 31 that may deliver at least a third portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments of the method for operating the exemplary power plant arrangement 10, a booster compressor 23 may be incorporated downstream of and in fluid connection with the main air compressor 12 and upstream of and in fluid connection with the turbine combustor 32. The booster compressor 23 may further compress the compressed oxygen-rich gas flow 24 before delivery into the turbine combustor 32.

In still other embodiments of the method for operating the power plant arrangement 10, a blower 42 may be fluidly connected to the recirculation loop 52 upstream of or downstream from the recirculated gas flow cooler 40. The blower 42 may be configured to increase the pressure of the recirculated gas flow 50 prior to delivery into the turbine compressor 30 via the recirculation loop 52.

In some embodiments, the recirculated gas flow cooler 40 and the blower 42 may be configured to condense water from the recirculated gas flow 50. In still other embodiments, the water condensed from the recirculated gas flow 50 may delivered from the recirculation loop 52 to the purified water collected from the condensation unit 66.

In some embodiments of the method for operating the exemplary power plant arrangement 10, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments of the method for operating the power plant arrangement 10, the power plant arrangement 10 may include a damper door 38 connected to the recirculation loop 52. The damper door 38 may be opened to vent a portion of the recirculated gas flow 50 to the atmosphere.

In other exemplary embodiments, a method for operating the exemplary power plant arrangement 100 of FIG. 2 is provided, wherein ambient air may be compressed using a main air compressor 12 to form at least a first portion of a compressed ambient gas flow 26. In some embodiments, the at least a first portion of the compressed ambient gas flow 26 may be delivered to an air separation unit 90 that may be configured to separate both nitrogen and oxygen from the at least a first portion of the compressed ambient gas flow 26. The at least a first portion of the compressed ambient gas flow 26 may be passed through the air separation unit 90 and at least a portion of the nitrogen in the at least a first portion of the compressed ambient gas flow 26 may be separated and removed from the at least a first portion of the compressed ambient gas flow 26 and at least a portion of the oxygen in the at least a first portion of the compressed ambient gas flow 26 may be separated and removed from the at least a first portion of the compressed ambient gas flow 26. Any suitable commercially available air separation unit may be used, typically using cryogenic technology. From the air separation unit 90, the nitrogen that may be removed from the at least a first portion of the compressed ambient gas flow 26 may be delivered to a nitrogen storage unit 70, wherein the nitrogen storage unit 70 may be fluidly connected to an output of the air separation unit 90 and may be configured to receive and to store nitrogen.

In some embodiments of the method for operating the exemplary power plant arrangement 100, the oxygen that may be removed from the at least a first portion of the compressed ambient gas flow 26 may be delivered from the air separation unit 90 to an oxidizer unit 62. In some embodiments, the oxygen may be further compressed using an oxygen compressor 94 that may be fluidly connected to the output of the air separation unit 90 and an input of the oxidizer unit 62.

In some embodiments of the method for operating the exemplary power plant arrangement 100, at least a second portion of the compressed ambient gas flow 26 may be delivered to the oxidizer unit 62. In some embodiments, the at least a second portion of the compressed ambient gas flow 26 may be further compressed using a secondary compressor 92 that may be fluidly connected to the output of the main air compressor 12 and an input of the oxidizer unit 62.

In some embodiments of the method for operating the power plant arrangement 100, the oxidizer unit 62 may be configured to receive both oxygen from the air separation unit 90 and the at least a second portion of the compressed ambient gas flow 26 from the main air compressor 12 and may mix both of these gas flows to produce a compressed oxygen-rich gas flow 24, which may have an increased oxygen concentration relative to the oxygen concentration of compressed ambient air. In some embodiments, the ratio of the oxygen received from the air separation unit 90 to the compressed ambient gas flow 26 received from the main air compressor 12 may be selectively adjusted, such that the oxygen content of the compressed oxygen-rich gas flow 24 may be selectively controlled to produce a compressed oxygen-rich gas flow 24 with a specific oxygen content. In some embodiments, the compressed oxygen-rich gas flow 24 may have an oxygen concentration in an amount from about 25 vol % to about 50 vol % oxygen, from about 30 vol % to about 50 vol % oxygen, or from about 40 vol % to about 50 vol % oxygen. As used herein, the term "oxygen content" is equivalent to the term "oxygen concentration."

Further, the compressed oxygen-rich gas flow 24 may be delivered from the oxidizer unit 62 to at least one gas turbine assembly of the exemplary power plant arrangement 100, wherein the at least one gas turbine assembly may include a turbine combustor 32 that may be fluidly connected to the oxidizer unit 62. The turbine combustor 32 may be configured to receive and to mix the compressed oxygen-rich gas flow 24 from the oxidizer unit 62, at least a first portion of a recirculated gas flow 50 from a turbine compressor 30, and a fuel stream 28, to form a combustible mixture and to burn the combustible mixture to produce the recirculated gas flow 50.

In addition, the method of operating the exemplary power plant arrangement 100 may include driving a turbine 34 using the recirculated gas flow 50, thereby causing the turbine 34 to rotate. As used herein, the term "driven using the recirculated gas flow" means the recirculated gas flow 50 expands upon exit from the turbine combustor 32 and upon entrance into the turbine 34, thereby causing the turbine 34 to rotate.

As illustrated by FIG. 2, in some embodiments, rotation of the turbine 34 may cause the turbine shaft 22 and also the turbine compressor 30 to rotate. The turbine shaft 22 may rotate in the turbine generator 20, such that rotation of the turbine shaft 22 may cause the turbine generator 20 to generate electricity. In some embodiments, the turbine compressor 30 may be fluidly connected to the turbine combustor 32 such that the turbine compressor 30 may compress and deliver the at least a first portion of the recirculated gas flow 50 to the turbine combustor 32.

In some embodiments of the method to operate the exemplary power plant arrangement 100, the recirculated gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated gas flow 50 may then be directed back into the recirculation loop 52 to a recirculated gas flow cooler 40. In still other embodiments, the recirculation loop 52 may not contain a heat recovery steam generator 36 and the recirculated gas flow 50 may instead be introduced directly into the recirculated gas flow cooler 40 upon exit from the turbine 34. In other embodiments, the recirculation loop 52 may not comprise the recirculated gas flow cooler 40.

In some embodiments, the recirculated gas flow 50 may be recirculated directly from the output of the turbine 34 to the input of the turbine compressor 30 using the recirculation loop 52. In other embodiments, the recirculated gas flow 50 may be cooled to a suitable temperature before delivery to the turbine compressor 30 using the recirculated gas flow cooler 40. The recirculated gas flow cooler 40 may be incorporated into the recirculation loop 52 anywhere downstream from the turbine 34. In some embodiments, a suitable temperature may be below about 66° C., below about 49° C., or below about 45° C.

The method for operating the exemplary power plant arrangement 100 may further comprise extracting at least a second portion of the recirculated gas flow 50 from the at least one gas turbine assembly using a recirculated gas flow extraction path 63 and delivering the at least a second portion of the recirculated gas flow 50 to a gas separation system 65. In some embodiments, the recirculated gas flow extraction path 63 may be regulated by an extraction valve 45.

The gas separation system 65 may be used to separate the at least a second portion of the recirculated gas flow 50 into a nitrogen portion and a carbon dioxide portion. In some embodiments of the exemplary power plant arrangement 10, the gas separation system 65 may comprise a carbon monoxide catalyst 64 that may be fluidly connected to the input of the gas separation system 65 and configured to receive the at least a second portion of the recirculated gas flow 50. The carbon monoxide catalyst 64 may be used to convert oxygen and carbon monoxide in the at least a second portion of the recirculated gas flow 50 to carbon dioxide and may produce an exhaust gas flow. Any suitable commercially available carbon monoxide catalyst may be used. The exhaust gas flow may be directed from the output of the carbon monoxide catalyst 64 to a water condensation unit 66. The water condensation unit 66 then may remove purified water from the exhaust gas flow and further deliver the exhaust gas flow to a carbon dioxide separation unit 68. The purified water may be collected. The carbon dioxide separation unit 68 may separate carbon dioxide from the exhaust gas flow and deliver a remaining exhaust gas flow, comprising primarily nitrogen, to the nitrogen storage unit 70. Any suitable commercially available carbon dioxide separation unit may be used.

As illustrated by FIG. 2, in some embodiments of the method for operating the exemplary power plant arrangement 100, the recirculated gas flow extraction path 63 may be in fluid communication with an output of the turbine compressor 30. In other embodiments, the recirculated gas flow extraction path 63 may be attached to any point of the recirculation loop 52.

As illustrated by FIG. 2, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

In some embodiments, the gas turbine assembly may further comprise a secondary flow path 31 that may deliver at least a third portion of the recirculated gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments of the method for operating the exemplary power plant arrangement 100, a booster compressor 23 may be incorporated downstream of and in fluid connection with the main air compressor 12 and upstream of and in fluid connection with the turbine combustor 32. The booster compressor 23 may further compress the compressed oxygen-rich gas flow 24 before delivery into the turbine combustor 32.

In still other embodiments of the method for operating the exemplary power plant arrangement 100, a blower 42 may be fluidly connected to the recirculation loop 52 upstream of or downstream from the recirculated gas flow cooler 40. The blower 42 may be configured to increase the pressure of the recirculated gas flow 50 prior to delivery into the turbine compressor 30 via the recirculation loop 52.

In some embodiments, the recirculated gas flow cooler 40 and the blower 42 may be configured to condense water from the recirculated gas flow 50. In still other embodiments, the water condensed from the recirculated gas flow 50 may delivered from the recirculation loop 52 to the purified water collected from the condensation unit 66.

In some embodiments of the method for operating the exemplary power plant arrangement 100, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments of the method for operating the exemplary power plant arrangement 100, the power plant arrangement 10 may include a damper door 38 connected to the recirculation loop 52. The damper door 38 may be opened to vent a portion of the recirculated gas flow 50 to the atmosphere.

In general, the concentration of oxygen in the compressed oxygen-rich gas flow 24 that may be delivered from the oxidizer unit 62 to the turbine combustor 32 may be controlled as a system parameter. The oxygen concentration may be optimized for a given power plant configuration based on cost and/or efficiency. The oxygen concentration has a direct effect on the combustion efficiency and emissions from the power plant as well as the durability of combustion and turbine hardware. Additionally, the chemical makeup of the recirculated gas flow 50 is directly determined by the oxygen concentration in the compressed oxygen-rich gas flow 24. Typically, higher concentrations of oxygen in the compressed oxygen-rich gas flow 24 result in higher concentrations of carbon dioxide in the recirculated gas flow 50. Thus, the oxygen concentration in the compressed oxygen-rich gas flow 24 may be altered, for instance, based on desired carbon capture needs.

In some embodiments, the power plant arrangements may be operated to deliver compressed nitrogen for enhanced oil recovery. In other embodiments, the power plant arrangements may be operated to deliver compressed carbon dioxide for enhanced oil recovery. In still other embodiments, the power plant arrangements may be operated to deliver water. In yet other embodiments, the power plant arrangements may be operated to deliver any combination of the foregoing.

In some embodiments, the method comprises operating a power plant arrangement that comprises one gas turbine assembly. In other embodiments, the method comprises operating a power plant arrangement that comprises two or more gas turbine assemblies that are fluidly connected by the intertrain conduit. In still other embodiments, the method comprises operating a power plant arrangement that comprises three or more gas turbine assemblies and one or more additional main air compressors, wherein the additional main air compressors are in fluid connection with each other and with the gas turbine assemblies. In yet other embodiments, the method comprises operating a power plant arrangement that is configured for substantially stoichiometric combustion. In still other embodiments, the method comprises operating a power plant arrangement that is configured for substantially zero emissions power production.

In some embodiments, the fuel stream 28 may comprise an organic gas, including but not limited to methane, propane, and/or butane. In still other embodiments, the fuel stream 28 may comprise an organic liquid, including but not limited to methanol and/or ethanol. In yet other embodiments, the fuel stream 28 may comprise a fuel source obtained from a solid carbonaceous material such as coal.

Other configurations and methods of operation are provided by U.S. patent applications including "Power Plant and Method of Use" to Daniel Snook, Lisa Wichmann, Sam Draper, and Noemie Dion Ouellet (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

I claim:

1. A power plant arrangement, comprising:
   at least one main air compressor for compressing ambient air into a compressed ambient gas flow;
   an air separation unit configured to separate oxygen and nitrogen from ambient air, wherein the at least a first portion of the compressed ambient gas flow is passed through the air separation unit, an oxygen flow and a nitrogen flow are derived from the at least a first portion of the compressed ambient gas flow, and wherein the air separation unit is fluidly connected to a nitrogen storage unit and the nitrogen storage unit is configured to receive and store the nitrogen flow from the air separation unit;

an oxidizer unit for receiving the oxygen flow from the air separation unit and at least a second portion of the compressed ambient gas flow from the at least one main air compressor, mixing the oxygen flow with the at least a second portion of the compressed ambient gas flow, and configured to deliver a compressed oxygen-rich gas flow to at least one gas turbine assembly; and the at least one gas turbine assembly, comprising:
- a turbine combustor, fluidly connected to the oxidizer unit, for mixing the compressed oxygen-rich gas flow with at least a first portion of a recirculated gas flow and a fuel stream to form a combustible mixture and for burning the combustible mixture and forming the recirculated gas flow;
- a turbine connected to the turbine combustor and to a turbine shaft, wherein the turbine is arranged to be driven by the recirculated gas flow from the turbine combustor;
- a turbine compressor, fluidly connected to the turbine combustor, and connected to the turbine shaft and being arranged to be driven thereby;
- a recirculation loop for recirculating the recirculated gas flow from the turbine to the turbine compressor;
- a recirculated gas flow extraction path for extracting at least a second portion of the recirculated gas flow from the at least one gas turbine assembly; and
- a gas separation system for receiving the at least a second portion of the recirculated gas flow from the recirculated gas flow extraction path and separating the at least a second portion of the recirculated gas flow into a nitrogen portion and a carbon dioxide portion, wherein the gas separation system comprises:
  - a carbon monoxide catalyst, fluidly connected to the input of the gas separation system and configured to receive the at least a second portion of the recirculated gas flow, for converting oxygen and carbon monoxide in the at least a second portion of the recirculated gas flow into carbon dioxide and to produce an exhaust gas flow;
  - a water condensation unit, fluidly connected to the output of the carbon monoxide catalyst, for removing water from the exhaust gas flow; and
  - a carbon dioxide separation unit, fluidly connected to the output of the water condensation unit, for separating the carbon dioxide portion from the exhaust gas flow and producing a remaining exhaust gas flow;
  - wherein the remaining exhaust gas flow is delivered to the nitrogen storage unit.

2. The power plant arrangement of claim 1, wherein the at least one gas turbine assembly further comprises a secondary flow path that delivers at least a third portion of the recirculated gas flow from the turbine compressor to the turbine as a secondary flow, and the secondary flow is further delivered into the recirculation loop after cooling and sealing the turbine.

3. The power plant arrangement of claim 1, wherein the power plant is configured to generate electricity with substantially stoichiometric combustion.

4. A method for operating a power plant, comprising:
- compressing ambient air with at least one main air compressor to form a compressed ambient gas flow;
- passing at least a first portion of the compressed ambient gas flow through a nitrogen separation unit, configured to separate a select quantity of nitrogen from ambient air, and removing the select quantity of nitrogen from the at least a first portion of the compressed ambient gas flow, wherein a nitrogen storage unit, fluidly connected to the nitrogen separation unit, is configured to receive and store nitrogen;
- delivering at least a first portion of the compressed ambient gas flow from the nitrogen separation unit to an oxidizer unit, wherein the oxidizer unit is configured to deliver a compressed oxygen-rich gas flow to at least one gas turbine assembly;
- mixing the compressed oxygen-rich gas flow with at least a first portion of a recirculated gas flow and a fuel stream to form a combustible mixture and burning the mixture in a turbine combustor to produce the recirculated gas flow;
- driving a turbine, connected to a turbine shaft, using the recirculated gas flow;
- driving a turbine compressor, using the turbine shaft, that is fluidly connected to the turbine combustor;
- recirculating the recirculated gas flow from the turbine to the turbine compressor using a recirculation loop;
- extracting at least a second portion of the recirculated gas flow from the at least one gas turbine assembly using a recirculated gas flow extraction path; and
- separating the at least a second portion of the recirculated gas flow into a nitrogen portion and a carbon dioxide portion using a gas separation system, wherein the gas separation system comprises:
  - a carbon monoxide catalyst, fluidly connected to the input of the gas separation system and configured to receive the at least a second portion of the recirculated gas flow, for converting oxygen and carbon monoxide in the second portion of the recirculated gas flow to carbon dioxide and to produce an exhaust gas flow;
  - a water condensation unit, fluidly connected to the output of the carbon monoxide catalyst, for removing water from the exhaust gas flow; and
  - a carbon dioxide separation unit, fluidly connected to the output of the water condensation unit, for separating the carbon dioxide portion from the exhaust gas flow and producing a remaining exhaust gas flow;
  - wherein the remaining exhaust gas flow is delivered to the nitrogen storage unit.

5. The method of claim 4, further comprising generating electricity with substantially stoichiometric combustion.

6. The method of claim 4, further comprising delivering at least a third portion of the recirculated gas flow from the turbine compressor to the turbine as a secondary flow through a secondary flow path, and the secondary flow is further delivered into the recirculation loop after cooling and sealing the turbine.

* * * * *